Dec. 3, 1929.   P. H. HAMILTON   1,737,755
THERMOSTATIC VALVE
Filed Jan. 2, 1929
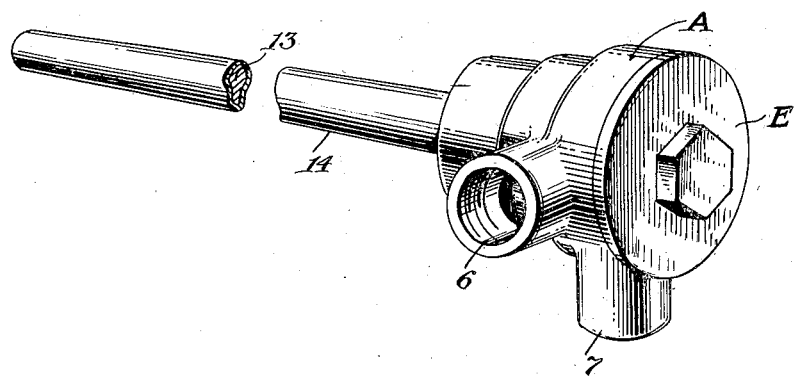
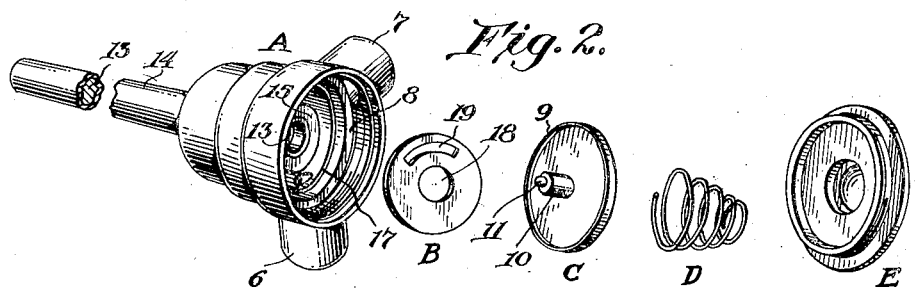
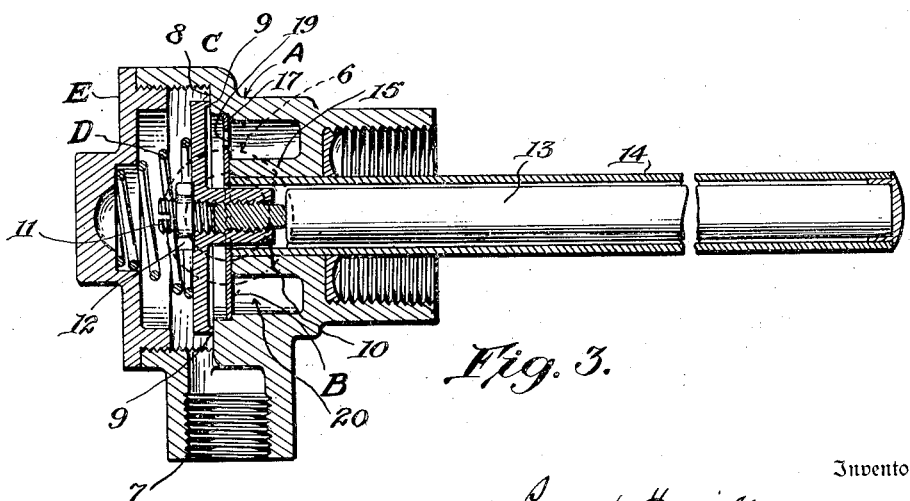

Patented Dec. 3, 1929

1,737,755

UNITED STATES PATENT OFFICE

PAUL H. HAMILTON, OF CLEVELAND, OHIO, ASSIGNOR TO THE SANDS MANUFACTURING COMPANY, OF CLEVELAND, OHIO, A CORPORATION

THERMOSTATIC VALVE

Application filed January 2, 1929. Serial No. 329,717.

This invention relates to valves and is particularly applicable to thermostatic gas valves of the kind used on automatic water heaters in which the flow of gas to the burners is controlled by the temperature of the water.

In such valves a defect has existed that if particles of dirt such as rust are deposited on the valve seat the valve will be held open to a certain extent and the gas will continue flowing to the burners, with troublesome results.

One of the objects of the present invention is to provide means for trapping any particles of dirt which may be carried along with the gas, before it reaches the valve seat, whereby the seat will stay clean and trouble is avoided.

A further object of the invention is to improve the structure of such valves in various other particulars, as will more fully appear hereinafter.

The invention is illustrated in the accompanying drawings in which Fig. 1 is a perspective view of the valve assembled. Fig. 2 is a perspective view of the same dissembled. Fig. 3 is a vertical longitudinal section.

The main parts of the valve comprise the casing A, the baffle or trap plate B, the valve C, the spring D, and the cap E.

The casing A has an inlet 6 and an outlet 7, the former being connected to any gas supply pipe and the latter to the burner. The annular valve seat is indicated at 8, consisting of a faced ledge or shoulder on the inside of the casing. The inlet 6 opens into the casing at the rear, inside of the seat, and the outlet 7 opens from the casing at the front or outside of the seat.

The valve C consists of a disk with a sharp rim 9 which closes against the seat, and is normally held closed, against the gas pressure, by the coiled spring D which is pressed against it by the cap E screwed into the outer end of the casing. On its inner side the valve has a cylindrical boss or short stem 10 through which extends a screw pin 11 which can be set at adjustment and held by lock nut 12. The pin projects slightly beyond the inner end of the stem and bears against the end of a rod 13 which is of considerable length and which is enclosed and sealed in a thermostatic tube 14 the end of which is soldered or otherwise sealed into a boss 15 formed integral with the casing at the axis thereof and behind the valve seat. The casing A will be screwed onto a nipple on the wall of the water heater (not shown) and the tube 14 will extend through the nipple into the tank where it is exposed to the temperature of the water. When the water is hot enough the elongation of the tube 14 will draw the rod 13 inwardly and the valve will be closed by the spring D to cut off the gas from the burners. When the water cools the contraction of the tube 14 will shift the rod 13 outwardly opening the valve to supply gas to the burners.

Just inside of the valve seat is the trap or baffle B which is a disk of sheet metal pressed at a press fit against the shoulder 17 on the wall of the casing, the central part of the disk fitting against the end of the tubular boss 15, and having a hole 18 through which the stem 10 of the valve works. The disk also has a slot 19, and when the parts are assembled the disk is so set that this slot is toward the top or upper part of the casing, and the inlet passage 6 is behind this disk, into an annular dust or dirt collecting chamber 20 which is formed between the outer wall of the casing and the central boss 15 and disk B.

It will be noted that the flow of gas will be from the inlet 6 into the chamber 20 and thence upwardly through the slot 19, and then around the valve, if open, to the outlet 7. Since the slot 19 is located at the upper part of the chamber the disk B forms a baffle and any particles of dirt or dust carried along by the gas will drop and collect in the space 20 on the inner side of the baffle and will not be carried over to the valve seat. This collection of dirt or dust is naturally quite small and the chamber 20 will be of sufficient size to collect the same for a rather long period of time, but it can be cleaned out on occasion by removing the cap, the valve and the disk. It will be found that this dust trap will effectively serve the purpose of preventing any dust or particles from collecting on the valve seat and obstructing the complete closure of the valve, which is a feature of some importance in such an apparatus.

Obviously changes may be made in the general structure, or the particular device forming the trap, within the scope of the invention and no limitation in this respect is implied.

I claim:

1. A gas valve provided with a trap consisting of a vertical disk and collecting chamber between the inlet to the valve and the valve seat, said disk having an opening through the upper part thereof.

2. The combination of a valve casing having a valve seat and valve therein, and a dust collecting chamber between the inlet to the valve and the seat, including a vertical baffle plate having an opening through the same, for the purpose stated.

3. The combination stated in claim 2, the casing having a central tubular boss against which the baffle plate rests and forming the inner wall of said chamber and the opening through the plate communicating with the upper part of said chamber.

4. A valve casing having an inlet and an outlet and a collecting chamber into which the inlet opens, a valve disk and valve seat between said chamber and the outlet, said chamber including a vertical baffle plate which forms one wall of the chamber, the plate having an opening through the upper part thereof.

5. The combination of a valve casing having an inlet and an outlet and a valve seat therein, a valve cooperating with said seat, a baffle between the valve and the inlet, and a thermostat supported by the casing and cooperating with the valve.

6. The combination stated in claim 5, the casing having a tubular boss in which the thermostat is supported and a collecting chamber extending around said boss between the inlet and the baffle.

In testimony whereof, I affix my signature.

PAUL H. HAMILTON.